US010666565B2

(12) United States Patent
Dhanabalan et al.

(10) Patent No.: US 10,666,565 B2
(45) Date of Patent: May 26, 2020

(54) METHOD TO MEASURE RELATIVE QOS GAINS AND TO REDUCE THE VARIANCE IN QOS FOR SIMILAR CONNECTIONS FOR DURING BANDWIDTH CONTENTION

(71) Applicant: Citrix Systems, Inc., Fort Lauderdale, FL (US)

(72) Inventors: Praveen Raja Dhanabalan, Bengaluru (IN); Deepti Kubair, Bengaluru (IN)

(73) Assignee: Citrix Systems, Inc., Fort Lauderdale, FL (US)

( * ) Notice: Subject to any disclaimer, the term of this patent is extended or adjusted under 35 U.S.C. 154(b) by 0 days.

(21) Appl. No.: 16/004,141

(22) Filed: Jun. 8, 2018

(65) Prior Publication Data
US 2019/0379603 A1    Dec. 12, 2019

(51) Int. Cl.
*H04L 12/801* (2013.01)
*H04L 12/26* (2006.01)

(52) U.S. Cl.
CPC .......... *H04L 47/12* (2013.01); *H04L 43/0829* (2013.01); *H04L 43/0888* (2013.01); *H04L 43/0894* (2013.01); *H04L 47/11* (2013.01)

(58) Field of Classification Search
CPC . H04L 47/12; H04L 43/0829; H04L 43/0888; H04L 43/0894; H04L 47/11
See application file for complete search history.

(56) References Cited

U.S. PATENT DOCUMENTS

| | | | | | |
|---|---|---|---|---|---|
| 4,933,940 | A | * | 6/1990 | Walter | G06F 9/4881 714/10 |
| 5,457,770 | A | * | 10/1995 | Miyazawa | G10L 15/12 704/255 |
| 6,744,767 | B1 | * | 6/2004 | Chiu | H04L 45/123 370/231 |
| 6,788,646 | B1 | * | 9/2004 | Fodor | H04L 12/5602 370/229 |
| 6,999,420 | B1 | * | 2/2006 | Chiu | H04L 47/10 370/231 |
| 7,599,283 | B1 | * | 10/2009 | Varier | H04L 45/586 370/216 |
| 8,141,022 | B2 | * | 3/2012 | Okamoto | G06F 17/5068 716/110 |
| 8,953,675 | B2 | * | 2/2015 | Laan | A63F 13/35 375/240.1 |
| 8,966,110 | B2 | * | 2/2015 | Lippincott | H04L 43/0894 709/223 |
| 9,246,842 | B2 | * | 1/2016 | Oyman | H04W 36/0094 |
| 10,148,578 | B2 | * | 12/2018 | Morris | H04L 47/127 |
| 2002/0167425 | A1 | * | 11/2002 | Ahn | H03M 5/145 341/59 |

(Continued)

*Primary Examiner* — Mehmood B. Khan
(74) *Attorney, Agent, or Firm* — Foley & Lardner LLP

(57) ABSTRACT

The systems and methods discussed herein provide for relative QoS gain measurement, and reduction in variance of QoS during bandwidth contention. In some implementations, the system measures relative QoS gains of, or penalties to, similar connections or network flows due to different factors that affect the transmission throughput and QoS. The system provides scheduling of packets on different connections or flows according to ratios of QoS penalties or gains on the connections or flows, preventing a well-performing connection or flow from cannibalizing throughput from under-performing connections or flows.

18 Claims, 4 Drawing Sheets

(56) References Cited

U.S. PATENT DOCUMENTS

| | | | | |
|---|---|---|---|---|
| 2004/0082363 A1* | 4/2004 | Hosein | ............... | H04W 28/18 |
| | | | | 455/560 |
| 2004/0111503 A1* | 6/2004 | Connor | ............... | H04L 47/10 |
| | | | | 709/223 |
| 2005/0047343 A1* | 3/2005 | Sharony | ............... | H04L 47/10 |
| | | | | 370/235 |
| 2006/0215742 A1* | 9/2006 | Modlin | ............... | H04L 1/0009 |
| | | | | 375/222 |
| 2009/0003366 A1* | 1/2009 | Chen | ............... | H04L 45/123 |
| | | | | 370/406 |
| 2010/0232307 A1* | 9/2010 | Kim | ............... | H04L 5/0032 |
| | | | | 370/252 |
| 2010/0246602 A1* | 9/2010 | Barreto | ............... | H04L 49/90 |
| | | | | 370/466 |
| 2011/0126110 A1* | 5/2011 | Vilke | ............... | G06F 9/54 |
| | | | | 715/736 |
| 2012/0054710 A1* | 3/2012 | Takita | ............... | H04J 14/0227 |
| | | | | 716/130 |
| 2012/0243410 A1* | 9/2012 | Vedula | ............... | H04L 41/5025 |
| | | | | 370/235 |
| 2013/0097647 A1* | 4/2013 | Brooks | ............... | H04L 41/0896 |
| | | | | 725/96 |
| 2014/0035692 A1* | 2/2014 | Chang | ............... | H03M 5/145 |
| | | | | 332/100 |
| 2014/0226475 A1* | 8/2014 | Stewart | ............... | H04L 47/20 |
| | | | | 370/230.1 |
| 2015/0109933 A1* | 4/2015 | Song | ............... | H04L 45/124 |
| | | | | 370/238 |
| 2016/0112495 A1* | 4/2016 | Gizis | ............... | H04L 69/14 |
| | | | | 709/219 |
| 2017/0085483 A1* | 3/2017 | Mihaly | ............... | H04L 47/11 |
| 2019/0109834 A1* | 4/2019 | Lyons | ............... | H04L 9/3242 |

* cited by examiner

METHOD TO MEASURE RELATIVE QOS GAINS AND TO REDUCE THE VARIANCE IN QOS FOR SIMILAR CONNECTIONS FOR DURING BANDWIDTH CONTENTION

FIELD OF THE DISCLOSURE

The present application generally relates to scheduling of packets for network transmission.

BACKGROUND OF THE DISCLOSURE

Various factors may affect transmission throughput and quality of service (QoS) for a communication flow, such as the specific path through the network the flow takes (including both physical length and logical length), flow control algorithms and/or compression algorithms applied to packets of the flow, etc. Even in similar connections or flows, these various factors may cause widely varying effects, particularly during bandwidth contention or as a result of congestion avoidance algorithms.

BRIEF SUMMARY OF THE DISCLOSURE

The systems and methods discussed herein provide for relative QoS gain measurement, and reduction in variance of QoS during bandwidth contention. In some implementations, the system measures relative QoS gains of, or penalties to, similar connections or network flows due to different factors that affect the transmission throughput and QoS. The system provides scheduling of packets on different connections or flows according to ratios of QoS penalties or gains on the connections or flows, preventing a well-performing connection or flow from cannibalizing throughput from under-performing connections or flows.

In one aspect, the present disclosure is directed to a method for multi-connection aware packet scheduling. The method includes monitoring, by a device, communications via a first connection and a second connection. The method also includes determining, by the device, a first communication penalty of the first connection and a second communication penalty of the second connection. The method also includes determining, by the device, a ratio of the first communication penalty and the second communication penalty. The method also includes scheduling, by the device, transmission of packets via the first connection and second connection according to the ratio of the communication penalties.

In some implementations, the method includes scheduling transmission of the packets according to the inverse of the ratio of the first communication penalty n to the second communication penalty m; and further comprising transmitting m packets via the first connection and n packets via the second connection during a predetermined time period.

In some implementations, the first connection and the second connection are between the device and a second device. In some implementations, the device is an intermediary device, and the first connection and second connection are between a second device and a third device and traverse the intermediary device.

In some implementations, the method includes identifying a packet loss rate of each of the first connection and the second connection. In some implementations, the method includes identifying a congestion window of each of the first connection and the second connection. In some implementations, the method includes identifying a compression ratio of each of the first connection and the second connection.

In some implementations, the method includes the first communication penalty is inversely proportional to a transmission rate of the first connection. In some implementations, the method includes determining that an average throughput of the first connection and second connection is greater than a threshold; and scheduling transmission of packets via the first connection and second connection according to the ratio of the communication penalties responsive to the determination that the average throughput of the first connection and second connection is greater than the threshold.

In some implementations, the method includes determining that the ratio of the first communication penalty to the second communication penalty is greater than a threshold; and scheduling transmission of packets via the first connection and second connection according to the ratio of the communication penalties responsive to the determination that the ratio of the first communication penalty to the second communication penalty is greater than the threshold.

In another aspect, the present disclosure is directed to a system for multi-connection aware packet scheduling. The system includes a device comprising a network interface in communication with at least one other device via a first connection and a second connection, and a packet scheduler. The packet scheduler is configured to monitor communications via the first connection and a second connection; determine a first communication penalty of the first connection and a second communication penalty of the second connection; determine a ratio of the first communication penalty and the second communication penalty; and schedule transmission of packets via the first connection and second connection according to the ratio of the communication penalties.

In some implementations, the packet scheduler is further configured to schedule packets according to the inverse of the ratio of the first communication penalty n to the second communication penalty m; and wherein the network interface is configured to transmit m packets via the first connection and n packets via the second connection during a predetermined time period.

In some implementations, the first connection and second connection are between the device and a second device. In some implementations, the device is an intermediary device, and the first connection and second connection are between a second device and third device and traverse the intermediary device.

In some implementations, the packet scheduler is further configured to identify a packet loss rate of each of the first connection and the second connection. In some implementations, the packet scheduler is further configured to identify a congestion window of each of the first connection and the second connection. In some implementations, the packet scheduler is further configured to identify a compression ratio of each of the first connection and the second connection.

In some implementations, the first communication penalty is inversely proportional to a transmission rate of the first connection. In some implementations, the packet scheduler is further configured to determine that an average throughput of the first connection and second connection is greater than a threshold; and scheduling transmission of packets via the first connection and second connection according to the ratio of the communication penalties is performed responsive to the determination that the average throughput of the first connection and second connection is greater than the threshold.

In some implementations, the packet scheduler is further configured to determine determining that the ratio of the first communication penalty to the second communication penalty is greater than a threshold; and scheduling transmission of packets via the first connection and second connection according to the ratio of the communication penalties is performed responsive to the determination that the ratio of the first communication penalty to the second communication penalty is greater than the threshold.

The details of various embodiments are set forth in the accompanying drawings and the description below.

BRIEF DESCRIPTION OF THE FIGURES

The foregoing and other objects, aspects, features, and advantages of the present solution will become more apparent and better understood by referring to the following description taken in conjunction with the accompanying drawings, in which.

Figure 1:
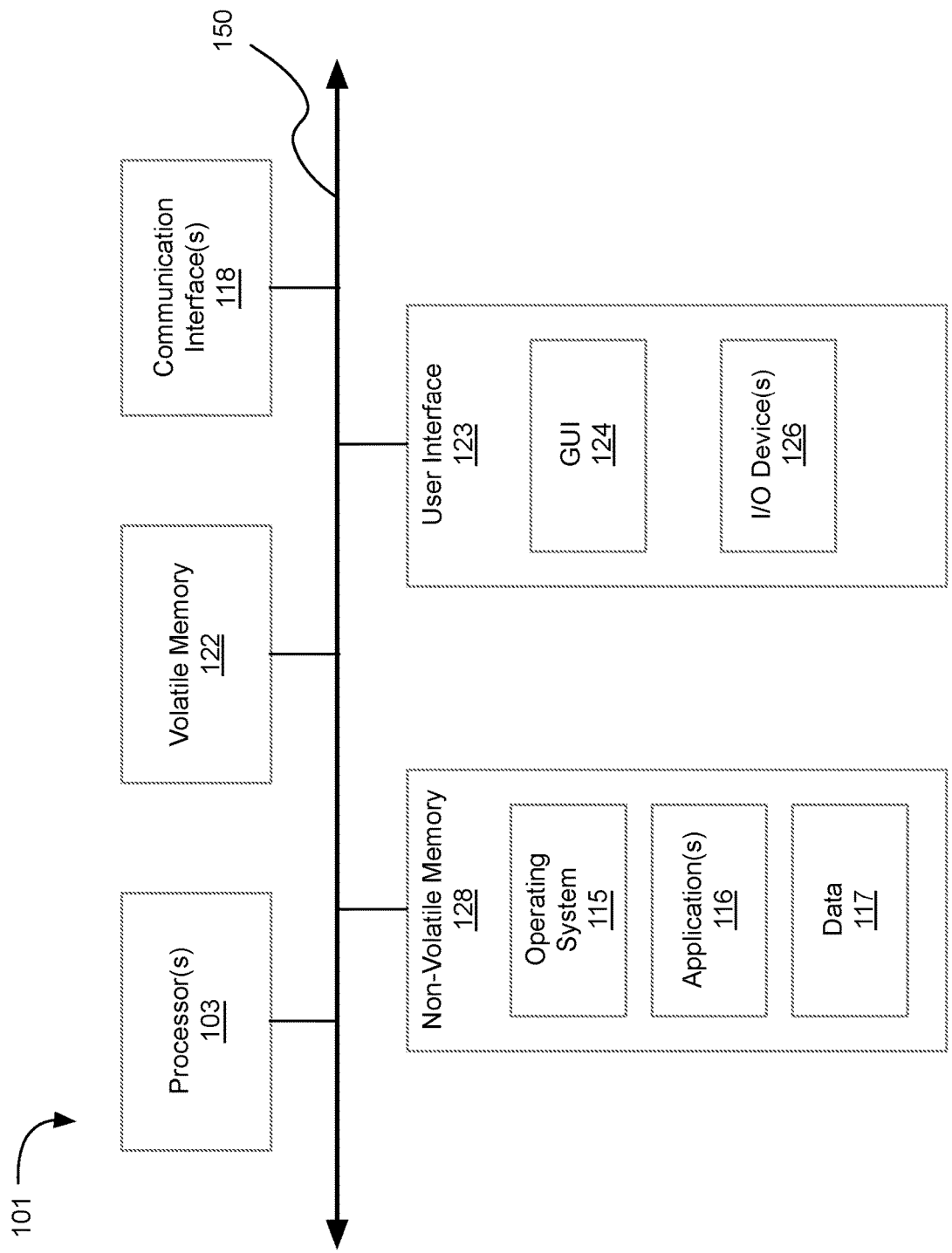
FIG. 1 is a block diagram illustrating an implementation of a network environment for use with the systems and methods discussed herein.

The features and advantages of the present solution will become more apparent from the detailed description set forth below when taken in conjunction with the drawings, in which like reference characters identify corresponding elements throughout. In the drawings, like reference numbers generally indicate identical, functionally similar, and/or structurally similar elements.

DETAILED DESCRIPTION

For purposes of reading the description of the various embodiments below, the following descriptions of the sections of the specification and their respective contents may be helpful:

Section A describes a network environment and computing environment which may be useful for practicing embodiments described herein;

Section B describes embodiments of systems and methods for relative QoS gain measurement, and reduction in variance of QoS during bandwidth contention.

A. Computing Environment

Prior to discussing the specifics of embodiments of the systems and methods of relative QoS gain measurement, and reduction in variance of QoS during bandwidth contention, it may be helpful to discuss the computing environments in which such embodiments may be deployed.

As shown in FIG. 1, computer 101 may include one or more processors 103, volatile memory 122 (e.g., random access memory (RAM)), non-volatile memory 128 (e.g., one or more hard disk drives (HDDs) or other magnetic or optical storage media, one or more solid state drives (SSDs) such as a flash drive or other solid state storage media, one or more hybrid magnetic and solid state drives, and/or one or more virtual storage volumes, such as a cloud storage, or a combination of such physical storage volumes and virtual storage volumes or arrays thereof), user interface (UI) 123, one or more communications interfaces 118, and communication bus 150. User interface 123 may include graphical user interface (GUI) 124 (e.g., a touchscreen, a display, etc.) and one or more input/output (I/O) devices 126 (e.g., a mouse, a keyboard, a microphone, one or more speakers, one or more cameras, one or more biometric scanners, one or more environmental sensors, one or more accelerometers, etc.). Non-volatile memory 128 stores operating system 115, one or more applications 116, and data 117 such that, for example, computer instructions of operating system 115 and/or applications 116 are executed by processor(s) 103 out of volatile memory 122. In some embodiments, volatile memory 122 may include one or more types of RAM and/or a cache memory that may offer a faster response time than a main memory. Data may be entered using an input device of GUI 124 or received from I/O device(s) 126. Various elements of computer 101 may communicate via one or more communication buses, shown as communication bus 150.

Computer 101 as shown in FIG. 1 is shown merely as an example, as clients, servers, intermediary and other networking devices and may be implemented by any computing or processing environment and with any type of machine or set of machines that may have suitable hardware and/or software capable of operating as described herein. Processor(s) 103 may be implemented by one or more programmable processors to execute one or more executable instructions, such as a computer program, to perform the functions of the system. As used herein, the term "processor" describes circuitry that performs a function, an operation, or a sequence of operations. The function, operation, or sequence of operations may be hard coded into the circuitry or soft coded by way of instructions held in a memory device and executed by the circuitry. A "processor" may perform the function, operation, or sequence of operations using digital values and/or using analog signals. In some embodiments, the "processor" can be embodied in one or more application specific integrated circuits (ASICs), microprocessors, digital signal processors (DSPs), graphics processing units (GPUs), microcontrollers, field programmable gate arrays (FPGAs), programmable logic arrays (PLAs), multi-core processors, or general-purpose computers with associated memory. The "processor" may be analog, digital or mixed-signal. In some embodiments, the "processor" may be one or more physical processors or one or more "virtual" (e.g., remotely located or "cloud") processors. A processor including multiple processor cores and/or multiple processors multiple processors may provide functionality for parallel, simultaneous execution of instructions or for parallel, simultaneous execution of one instruction on more than one piece of data.

Communications interfaces 118 may include one or more interfaces to enable computer 101 to access a computer network such as a Local Area Network (LAN), a Wide Area Network (WAN), a Personal Area Network (PAN), or the Internet through a variety of wired and/or wireless or cellular connections.

In described embodiments, the computing device 101 may execute an application on behalf of a user of a client computing device. For example, the computing device 101 may execute a virtual machine, which provides an execution session within which applications execute on behalf of a user or a client computing device, such as a hosted desktop session. The computing device 101 may also execute a terminal services session to provide a hosted desktop environment. The computing device 101 may provide access to a computing environment including one or more of: one or more applications, one or more desktop applications, and one or more desktop sessions in which one or more applications may execute.

Additional details of the implementation and operation of network environment, computer 101 and client and server computers may be as described in U.S. Pat. No. 9,538,345, issued Jan. 3, 2017 to Citrix Systems, Inc. of Fort Lauderdale, Fla., the teachings of which are hereby incorporated herein by reference.

B. Systems and Methods for Relative QoS Gain Measurement, and Reduction in Variance of QoS During Bandwidth Contention Various factors may affect transmission throughput and quality of service (QoS) for a communication flow between two end point devices (e.g. clients, servers, appliances, modems, or other devices). These factors may include the specific path through the network the flow takes, including both physical length and logical length. For example, two communications flows between devices in New York and Los Angeles may travel different paths, with one flow going through Detroit, and the other flow going through Dallas, due to routing, load balancing, and other features provided by intermediary devices in the network. As a result, one path may be significantly longer than the other, resulting in delays due to travel time of the signals. In another example, two communications flows may travel similar geographic path lengths, but one flow may traverse additional intermediary switches and routers resulting in a longer logical path length, resulting in added latency and delays due to processing and retransmission time. A similar factor that may affect QoS and throughput includes loss rates or jitter that adversely affect one flow compared to another.

Another factor that may affect QoS and throughput includes intermediary schedulers or load balancers, such as a weighted fair queueing scheduler. For example, even if both communications flows travel via the same path between the same endpoints, an intermediary scheduler may delay some of the packets of one flow to allow packets of a third flow to be transmitted. Thus, network congestion unrelated to the flows may still affect them, and may potentially not affect them equally.

Another factor that may affect QoS and throughput may be unrelated to physical characteristics of the network, but may be a result of processing by the device (or additional processing applied by an intermediary device). For example, a compression algorithm applied to packets of one flow and not the other flow may result in the compressed flow having a much higher effective throughput, even if the number of packets exchanged in each flow is equal. Similarly, flow control algorithms may result in unequal effects on each flow. For example, in some implementations, an intermediary device may provide TCP proxying or termination, reducing the apparent round trip time of the flow. For example, in some implementations, an intermediary device may emulate the endpoint of the flow by providing acknowledgements to the source device for packets received at the intermediary device, and may then retransmit or forward the received packets to the destination device. This may be particularly helpful in instances where the path between the source device and intermediary device has a low round trip time, but low bandwidth, while the path between the intermediary device and destination device has a high round trip time and high bandwidth. Because of the lower apparent round trip time, a proxied flow may increase its TCP Window Size (e.g. congestion window, or c wnd) at a faster rate than a flow that is not proxied (or may increase similar congestion avoidance windows in other protocols). Thus, even in similar connections or flows, these various factors may cause widely varying effects, particularly during bandwidth contention or as a result of congestion avoidance algorithms.

Figure 2A:
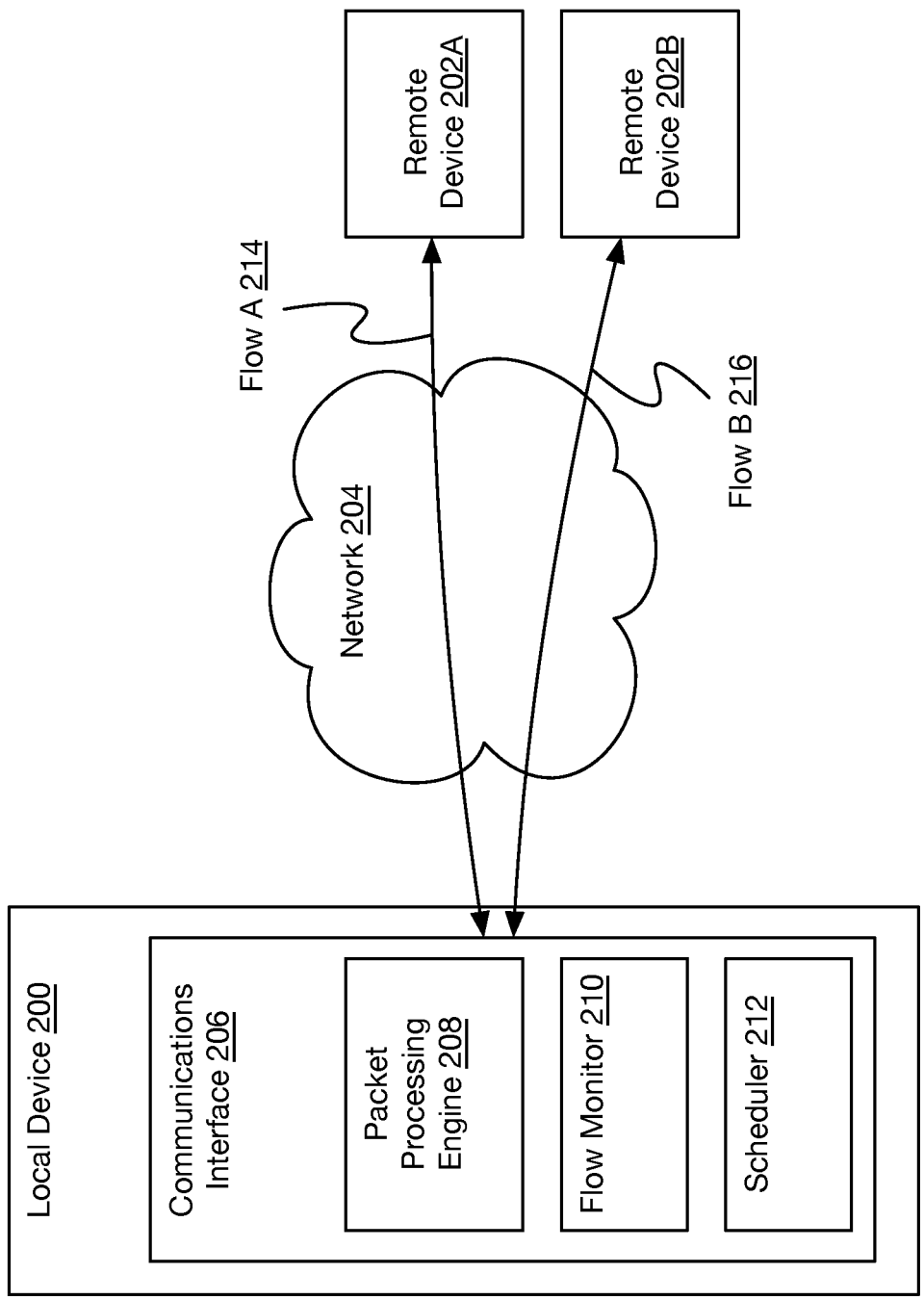
FIG. 2A is a block diagram illustrating an implementation of a system for relative QoS gain measurement, and reduction in variance of QoS during bandwidth contention.

For example, FIG. 2A is a block diagram of a network environment with two different communication flows, flow A 214 and flow B 216, between a local device 200 and two remote devices 202A and 202B, via a network 204. Although shown as the endpoint of the flows, in many implementations, local device 200 may be an intermediary device, and the flows may be retransmitted by local device 200 to further end points (e.g. servers, client devices, etc.). Local device 200 and remote devices 202A-202B may comprise any type and form of computing devices, including laptop computers, desktop computers, tablet computers, wearable computers, smart phones, smart televisions, video game consoles, workstations, servers, blade servers, smart appliances (e.g. Internet-of-Things (IoT) devices), network appliances (e.g. routers, switches, firewalls, network accelerators, proxies, access points, modems, gateways, etc.), physical computing devices, virtual computing devices executed by one or more physical computing devices, server clouds, server farms, server clusters, appliance clusters, or any other type and form of computing device or devices. Network 204 may comprise any type and form of network or combinations of networks, including cellular networks, WiFi networks, broadband networks, telephone networks, microwave networks, fiber optic networks, satellite networks, etc. Network 204 may comprise a local area network (LAN), metropolitan area network (MAN), wide area network (WAN) such as the Internet, virtual private network (VPN), mesh or peer-to-peer network, or any other type and form of network or combinations of networks. In many implementations, network 204 may comprise one or more additional devices not illustrated, such as gateways, switches, routers, load balancers, etc.

Flow A 214 and Flow B 216 may each comprise a communication flow between an application or applications on a corresponding remote device 202A or 202B and the local device 200. For example, a flow may comprise communications between a web browser and web server, an online video game and database server, a media player and a streaming media server, video or voice-over-IP endpoints, a mail application and mail server, or any other type and form of communications flow. Flows may utilize different protocols, such as application layer protocols such as the file transfer protocol (FTP) or the hypertext transfer protocol (HTTP), presentation layer protocols such as the independent computing architecture protocol (ICA), session layer protocols such as the real-time transport protocol (RTP), transport layer protocols such as the transport control protocol (TCP) or user datagram protocol (UDP), internet layer protocols such as various varieties of the internet protocol (IPv4 or IPv6), or any other protocols or combinations of protocols. A flow, sometimes referred to as a packet flow, traffic flow, network flow, or communication flow, may comprise a sequence of packets between a source and destination, and may include unidirectional or bidirectional traffic (e.g. requests and responses).

Figure 2B:
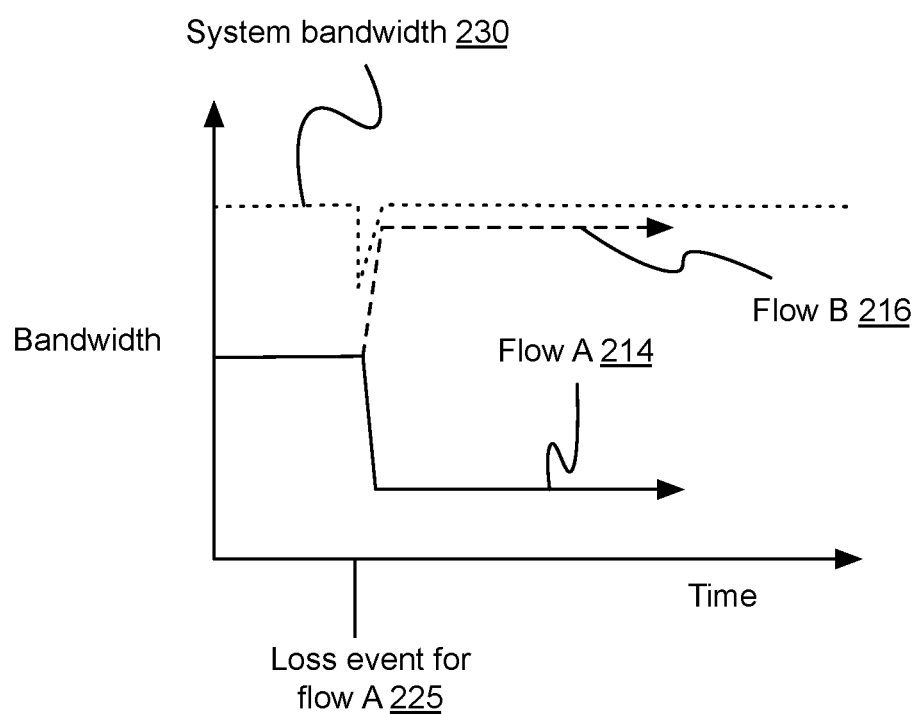
FIG. 2B is a graph illustrating bandwidth over time for two example communications flows, in some implementations.

As discussed above, in many implementations, differences in network characteristics or communications parameters on each flow may result in very different throughput or QoS. Given two flows 214 and 216 with a common endpoint or portion of a path (e.g. local device 200), temporary impairment to one flow may result in significant performance imbalances. For example, referring briefly to FIG. 2B, illustrated is a graph of bandwidth over time for two network flows 214-216. At a first time period prior to a loss event 225, the flows may have equal throughput (e.g. 120 kbps). The loss event 225 may be any event that causes a packet to be lost on a flow, such as noise or interference, overloading of an intermediary buffer, etc.

In implementations of many congestion avoidance algorithms, such as the TCP flow control algorithms, after a loss, a device may reduce it window size or transmission rate by a predetermined amount. For example, in the example implementation shown, after experiencing a loss event, the device transmitting flow A 214 may reduce its window size by half (e.g. 60 kbps). If the overall system bandwidth 230 were infinite and there were no other actors in the system, the device would eventually be able to recover by expanding its window size up to the prior level (e.g. 120 kbps). However, with a finite system bandwidth, the device communicating the second flow B 216 may identify that the system has free capacity, and may increase its window size (e.g. to above 120 kbps) to utilize that capacity. If, as a result, the total system bandwidth 230 reaches its maximum, the first flow 214 may not be able to recover, as there may be no free capacity such that it can increase its window size. This may be particularly exacerbated in instances where multiple packets are lost, such that the device reduces its window size for the flow even further. Because congestion avoidance algorithms like TCP Slow Start may be slower to consume free bandwidth after a loss event than after successful communications, the flow that does not experience the loss rate may consume the limited bandwidth faster than the flow that did experience the loss rate may recover.

Furthermore, FIGS. 2A-2B only illustrate two flows. However, in many implementations, multiple flows may utilize the same limited bandwidth. For example, a remote desktop server may serve dozens of communications flows. After a loss event on a single flow and corresponding reduction of throughput on the flow, the other flows may quickly consume the remaining bandwidth, competing amongst themselves to acquire the most. A system that initially had balanced throughputs may quickly end up with severe imbalances.

Similarly, as discussed above, in many implementations, one flow may be terminated by an intermediary proxy, resulting in an apparent shorter round trip time. Proxying flows may be costly in terms of memory and processing power by the intermediary, so in many implementations, only a subset of the flows traversing the intermediary may be proxied. Due to the shorter round trip time of these flows and congestion avoidance algorithms such as TCP Slow Start, the throughput of proxied flows may increase significantly faster than that of unproxied flows, resulting in imbalances, even with no packet losses.

Also, as discussed above, compression or deduplication applied to one flow, but not the other, may cause packet losses to more severely affect the flows. For example, a first flow with a 1:2 compression ratio may send twice as many packets to the destination device as a second flow with a 1:1 compression ratio (e.g. uncompressed). If the window size of the second flow is reduced by 50%, such as due to a loss event, the resulting throughput is only one quarter of that of the first flow.

The systems and methods discussed herein address these potential imbalances by providing for relative QoS gain measurement and reduction in variance of QoS during bandwidth contention, by scheduling packets while being aware of characteristics and performance of multiple connections or flows. In some implementations, the system measures relative QoS gains of, or penalties to, similar connections or network flows due to different factors that affect the transmission throughput and QoS. The system provides scheduling of packets on different connections or flows according to ratios of QoS penalties or gains on the connections or flows, preventing a well-performing connection or flow from cannibalizing throughput from underperforming connections or flows.

In brief overview, the system may measure the QoS gains or losses experienced by individual flows or connections (e.g. as a result of packet losses, proxying, compression, network characteristics, etc., and referred to generally as communications penalties), relative to an initial starting throughput. The system may compare the penalties for each flow to determine a ratio, and may schedule packets for each flow according to these ratios, such that QoS benefits are applied to connections that are underperforming or are penalized, to aid in recovery.

Returning to FIG. 2A, a device such as local device 200 may include a communications interface 206, such as interface(s) 118 discussed above. Although only illustrated on local device 200, each other device may similarly include a communications interface 206. In some implementations, a communications interface 206 may include a packet processing engine 208. Packet processing engine 208 may comprise an application, service, server, daemon, routine, or other executable logic for monitoring, identifying, analyzing, processing, and/or transmitting packets via a communication interface. In some implementations, packet processing engine 208 may comprise hardware, such as an ASIC or FPGA or co-processor, while in other implementations, packet processing engine 208 may comprise software executed by a processor or co-processor of device 200, such as drivers of a network stack of an operating system of a device.

Communications interface 206 may comprise a flow monitor 210. Flow monitor 210 may comprise an application, service, server, daemon, routine, or other executable logic for monitoring communications flows 214, 216 traversing the device 200. Although only two flows are shown, in many implementations, a large number of network flows may traverse device 200 and may be monitored by flow monitor 210. As discussed above, in some implementations, the device may be an intermediary and the flow may continue to or be transmitted to another remote device (not illustrated). In other implementations, the device may be an endpoint of a flow as shown. In still other implementations, the device may serve as an endpoint for some flows and an intermediary for others. In some implementations, flow monitor 210 may comprise hardware, such as an ASIC or FPGA or co-processor, while in other implementations, flow monitor 210 may comprise software executed by a processor or co-processor of device 200, such as drivers of the network stack of the operating system of the device. Flow monitor 210 may measure throughput or bandwidth of each flow periodically, such as once per second, once per ten seconds, once per hundred milliseconds, etc. In some implementations, flow monitor 210 may determine an average throughput or bandwidth of each flow, based on the new measurement and previous measurements. In some implementations, this may comprise a weighted average (e.g. with decreasing coefficient values for older measurements).

In some implementations, flow monitor 210 may also determine the communications penalty for each flow. The penalties may be caused by different loss rates, different proxying or termination, different compression ratios, etc. Penalties may be determined as ratios relative to a starting throughput or QoS level. For example, in one implementation, each flow may be assigned a communications penalty value of 1 (or having a penalty ratio of 1:1 of initial penalty to current penalty). If a first flow subsequently loses a packet and reduces its sending rate by half (assuming a lossless protocol such as TCP), the resulting communication penalty for the flow is doubled, with the resulting penalty ratio being 1:2. Similarly, if a first flow is unproxied and a second flow is proxied, such that the second flow may increase its transmission rate exponentially faster than the first flow, the penalty ratio between the first flow and second flow may increase to 1:2 after a first round trip time, then 2:4, then 3:8, etc. Likewise, if a first flow is uncompressed, while a second flow is compressed at a ratio of 2:1, the resulting penalty ratio between the flows is 1:2. These penalties and ratios may be determined and updated periodically by the flow monitor, in many implementations.

Communications interface 206 may also include a scheduler 212. Scheduler 212 may comprise an application, service, server, daemon, routine, or other executable logic for analyzing flow throughputs and relative communications penalties, and scheduling packets for transmission via the communications interface. In some implementations, scheduler 212 may comprise hardware, such as an ASIC or FPGA or co-processor, while in other implementations, scheduler 212 may comprise software executed by a processor or co-processor of device 200, such as drivers of a network stack of an operating system of a device. Scheduler 212 may schedule packet transmissions for each flow based on the communications penalty ratios between said flows. For example, given a penalty ratio between two flows of 4:5, the scheduler may schedule packets from each in the inverse ratio of 5:4, such that the more penalized flow is provided a quicker opportunity to recover.

In some implementations, the scheduler 212 may adjust scheduling from a default or balanced schedule in response to identifying an under-performing flow or connection. In some implementations, a connection or flow may be identified as under-performing responsive to its throughput being below a predetermined threshold (e.g. a lower bandwidth limit required by an application, such as a 100 kbps threshold for an ICA connection), based on a selection by an administrator or feedback from a user of a device, based on a high variance in actual bandwidth or throughput (e.g. indicating frequent losses and recoveries), by having a throughput that is below a predetermined fraction of the average throughput of the flows or connections, or by any other such methods. In some implementations, readjustment or scheduling of the packets may be performed responsive to an incoming throughput for an under-performing flow being greater than its outgoing throughput, with its outgoing throughput being less than a dynamically determined or predetermined threshold.

Thus, in one implementation, the scheduler may, for every under-performing connection or flow, determine an average bandwidth of said under-performing connection or flow, and one or more properly performing connections or flows (e.g. having low variance or having throughput above the dynamic or predetermined thresholds; although referred to as "properly" performing, this term is used solely in contradistinction to "under-performing", and "properly" performing flows may still be impaired, experiencing packet loss, etc.). If the average is above a predetermined or dynamically set threshold, then the scheduler may determine that it may share communication penalties or benefits between the flows. This may prevent one poorly-performing flow from cannibalizing other poorly-performing flows. The scheduler may schedule packets for the under-performing connection or flow and the one or more properly performing connections or flows at a rate inversely proportional to the communications penalty ratio. For example, if the ratio is 1:4, the scheduler may schedule 80% of transmissions to be packets from the under-performing flow or connection, and 20% of transmissions from the properly performing flow or flows.

Figure 3:
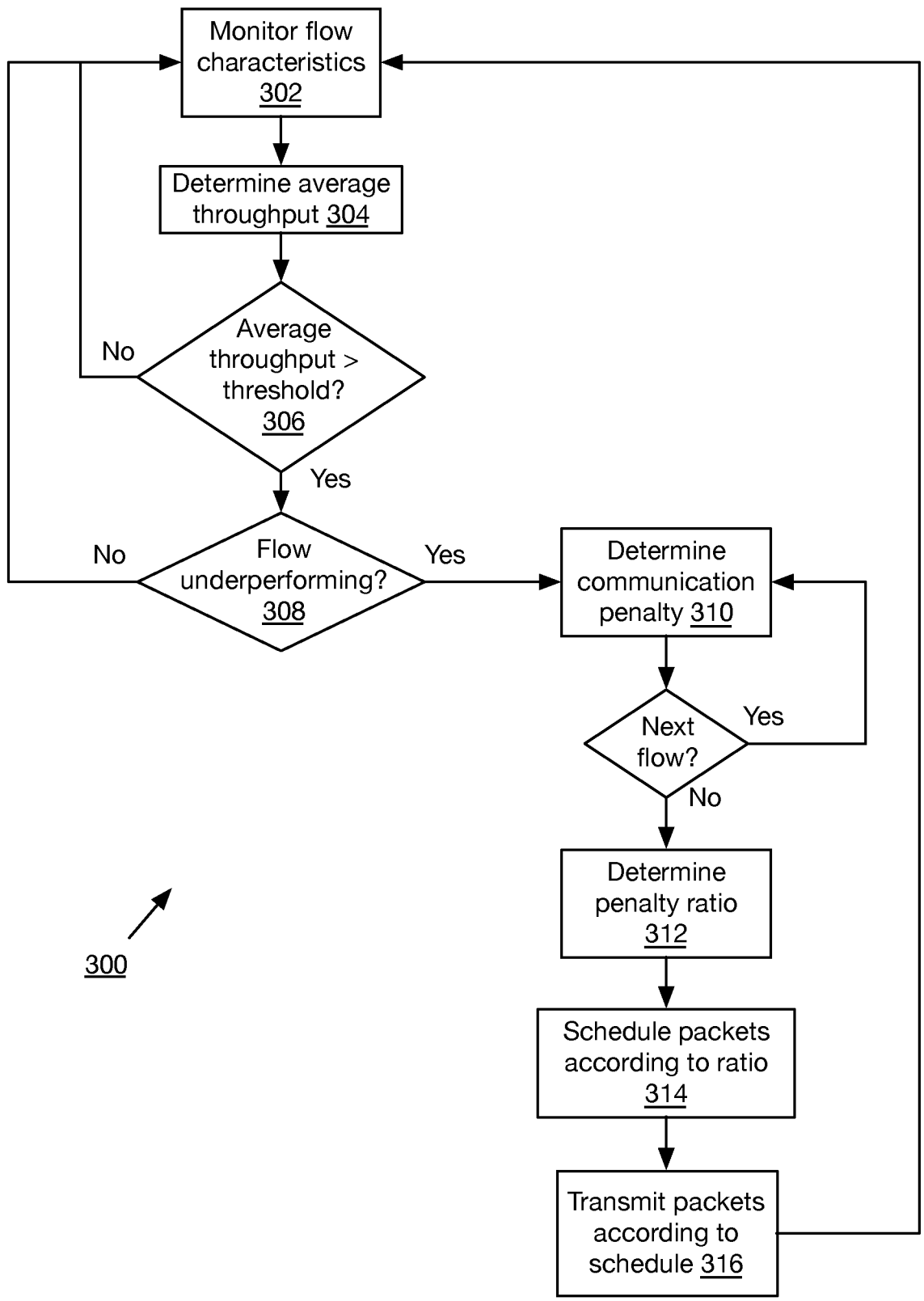
FIG. 3 is a flow chart illustrating an implementation of a method for relative QoS gain measurement, and reduction in variance of QoS during bandwidth contention.

FIG. 3 is a flow chart illustrating an implementation of a method 300 for relative QoS gain measurement, and reduction in variance of QoS during bandwidth contention. At step 302, a flow monitor of a device may monitor characteristics of flows or connections traversing the device. As noted above, the device may be an endpoint of the flow or may be an intermediary of the flow between two endpoints. The flow monitor may measure throughput or bandwidth of each flow in many implementations. In some implementations, the flow monitor may measure jitter, packet loss rates, round trip time, latency, compression ratios, or other characteristics of each flow.

At step 304, in some implementations, a scheduler of the device may determine an average throughput of the monitored flows. In some implementations, the monitored flows may be a subset of flows traversing the device. For example, in some implementations, flows corresponding to remote desktop or application streaming may be monitored and rebalanced based on communications penalty ratios, while flows corresponding to email or less urgent traffic may not be rebalanced.

At step 306, in some implementations, the scheduler may determine if an average throughput of the flows exceeds a predetermined threshold. In some implementations, this threshold may comprise a minimum throughput required for an application, and may be set by an administrator or manufacturer. In other implementations, the threshold may be dynamically determined, such as by a fraction of a maximum throughput or a system bandwidth. For example, the threshold may be set to 10%, 20%, 30%, or any other such percentage of a maximum throughput experienced by any flow in some implementations. In other implementations, the threshold may be set to 10%, 20%, 30%, or any other such percentage of a system bandwidth. If the average throughput is not greater than the threshold, then rebalancing QoS penalties may result in degradation of flows that are considered "good". Accordingly, in some implementations, as a result, the method may return to step 302.

At step 308, the scheduler may determine if a flow is under-performing. As discussed above, in some implementations, the scheduler may compare a throughput of a flow to a threshold, and the flow may be determined to be underperforming if its throughput is less than the threshold. The threshold may be predetermined, set by an administrator or user, or may be dynamically determined (e.g. as a percentage of total system throughput or capacity, or a percentage of the flow average throughput determined at step 304). In some implementations, the scheduler may determine if a flow is under-performing based on a variance of the throughput of the flow (e.g. between different measurements by the flow monitor). If the variance is above a threshold (again, either predetermined, dynamically set relative to average variances of other flows such as two or three times the average variance, dynamically set relative to a minimum variance experienced by the other flows, etc.), then the flow may be determined to be under-performing. If no flows are under-performing, the method may return to step 308.

At step 310, the scheduler or flow monitor may determine a communication penalty for the underperforming flow. As discussed above, the communication penalty may be value based on the throughput of the flow and/or variance of the flow, such as a compression ratio used for packets of the flow, a window size of the flow, or any other such parameter. The scheduler or flow monitor may also determine the communication penalty for one or more additional properly performing flows. As discussed above, the communication penalty may comprise a ratio of current measured throughput relative to a maximum throughput or throughput at an initial measurement time. For example, a throughput at a maximum window size for the flow may be compared to a throughput after shrinking the window size due to packet losses and retransmissions. Thus, an initial value of, for example, 1, for the penalty at a maximum window size may increase to 2 responsive to the window size being halved. In some implementations, penalties may be less than 1, for example if a window size is further increased from the initial "maximum" value, or if a compression ratio is increased (e.g. due to a dictionary for the data communication being sufficiently populated such that more symbols may be compressed).

At step 312, the scheduler or flow monitor may determine a penalty ratio of the communication penalty for the under-performing flow and the communication penalty of a properly performing flow (or an average of penalties of a plurality of properly performing flows). For example, if the properly performing flow has experienced no penalties or loss events, it might still have a penalty value of 1; if the under-performing flow has halved a window size and been classified as having a penalty of 2, the resulting ratio may be 1:2 (or 2:1, depending on order of comparison, in various implementations). Similarly, if a plurality of properly performing flows have an average penalty of 2, the resulting ratio would still be 1:2.

At step 314, in some implementations, the scheduler may schedule packets from the flows according to the inverse of the determined penalty ratio. Thus, given a penalty ratio for a first flow to a second flow of n:m, the scheduler may schedule packets from the first flow and second flow in the ratio m:n. For example, given a penalty ratio of 1:2 from the under-performing flow to a properly performing flow, the scheduler may schedule 2 packets from the under-performing flow to be transmitted for every 1 packet from the properly performing flow. In implementations in which penalties from a plurality of properly performing flows are averaged to determine the ratio, the scheduler may also schedule packets for these additional flows. For example, given a penalty ratio of 2:3 and comparison of the under-performing flow to an average of two properly performing flows, the scheduler may schedule 3 packets of the under-performing flow for every two packets of the two properly performing flows (e.g. 1 packet from each properly performing flow). Thus, the penalty or benefit from multiple flows may be effectively distributed to the under performing flow without unbalancing the properly performing flows.

At step 316, the packets may be transmitted according to the schedule. In some implementations, the device may continue transmitting packets of each flow according to the schedule for a predetermined time period, while in other implementations, the device may transmit a set of packets and return to step 302 to determine if the throughput for each flow has changed.

Accordingly, the systems and methods discussed herein provide for relative QoS gain measurement, and reduction in variance of QoS during bandwidth contention. In some implementations, the system measures relative QoS gains of, or penalties to, similar connections or network flows due to different factors that affect the transmission throughput and QoS. The system provides scheduling of packets on different connections or flows according to ratios of QoS penalties or gains on the connections or flows, preventing a well-performing connection or flow from cannibalizing throughput from under-performing connections or flows.

Although the disclosure may reference one or more "users", such "users" may refer to user-associated devices or stations (STAs), for example, consistent with the terms "user" and "multi-user" typically used in the context of a multi-user multiple-input and multiple-output (MU-MIMO) environment.

Although examples of communications systems described above may include devices and APs operating according to an 802.11 standard, it should be understood that embodiments of the systems and methods described can operate according to other standards and use wireless communications devices other than devices configured as devices and APs. For example, multiple-unit communication interfaces associated with cellular networks, satellite communications, vehicle communication networks, and other non-802.11 wireless networks can utilize the systems and methods described herein to achieve improved overall capacity and/or link quality without departing from the scope of the systems and methods described herein.

It should be noted that certain passages of this disclosure may reference terms such as "first" and "second" in connection with devices, mode of operation, transmit chains, antennas, etc., for purposes of identifying or differentiating one from another or from others. These terms are not intended to merely relate entities (e.g., a first device and a second device) temporally or according to a sequence, although in some cases, these entities may include such a relationship. Nor do these terms limit the number of possible entities (e.g., devices) that may operate within a system or environment.

It should be understood that the systems described above may provide multiple ones of any or each of those components and these components may be provided on either a standalone machine or, in some embodiments, on multiple machines in a distributed system. In addition, the systems and methods described above may be provided as one or more computer-readable programs or executable instructions embodied on or in one or more articles of manufacture. The article of manufacture may be a hard disk, a CD-ROM, a flash memory card, a PROM, a RAM, a ROM, or a magnetic tape. In general, the computer-readable programs may be implemented in any programming language, such as LISP, PERL, C, C++, C#, PROLOG, or in any byte code language such as JAVA. The software programs or executable instructions may be stored on or in one or more articles of manufacture as object code.

While the foregoing written description of the methods and systems enables one of ordinary skill to make and use what is considered presently to be the best mode thereof, those of ordinary skill will understand and appreciate the existence of variations, combinations, and equivalents of the specific embodiment, method, and examples herein. The present methods and systems should therefore not be limited by the above described embodiments, methods, and examples, but by all embodiments and methods within the scope and spirit of the disclosure.

It should be understood that the systems described above may provide multiple ones of any or each of those components and these components may be provided on either a standalone machine or, in some embodiments, on multiple machines in a distributed system. The systems and methods described above may be implemented as a method, apparatus or article of manufacture using programming and/or engineering techniques to produce software, firmware, hardware, or any combination thereof. In addition, the systems and methods described above may be provided as one or more computer-readable programs embodied on or in one or more articles of manufacture. The term "article of manufacture" as used herein is intended to encompass code or logic accessible from and embedded in one or more computer-readable devices, firmware, programmable logic, memory devices (e.g., EEPROMs, ROMs, PROMs, RAMs, SRAMs, etc.), hardware (e.g., integrated circuit chip, Field Programmable Gate Array (FPGA), Application Specific Integrated Circuit (ASIC), etc.), electronic devices, a computer readable non-volatile storage unit (e.g., CD-ROM, hard disk drive, etc.). The article of manufacture may be accessible from a file server providing access to the computer-readable programs via a network transmission line, wireless transmission media, signals propagating through space, radio waves, infrared signals, etc. The article of manufacture may be a flash memory card or a magnetic tape. The article of manufacture includes hardware logic as well as software or programmable code embedded in a computer readable medium that is executed by a processor. In general, the computer-readable programs may be implemented in any programming language, such as LISP, PERL, C, C++, C#, PROLOG, or in any byte code language such as JAVA. The software programs may be stored on or in one or more articles of manufacture as object code.

While various embodiments of the methods and systems have been described, these embodiments are illustrative and in no way limit the scope of the described methods or systems. Those having skill in the relevant art can effect changes to form and details of the described methods and systems without departing from the broadest scope of the described methods and systems. Thus, the scope of the methods and systems described herein should not be limited by any of the illustrative embodiments and should be defined in accordance with the accompanying claims and their equivalents.

What is claimed is:

1. A method for multi-connection packet scheduling, comprising:
    monitoring, by a device, communication flows via a first connection and a second connection;
    determining, by the device, a value n of a first communication penalty for the first connection and a value m of a second communication penalty for the second connection;
    determining, by the device, a ratio of the value n of the first communication penalty and the value m of the second communication penalty;
    scheduling, by the device, transmission of packets via the first connection and the second connection according to an inverse of the ratio of the value n of the first communication penalty to the value m of the second communication penalty; and
    transmitting a number m of packets via the first connection and a number n of packets via the second connection during a predetermined time period;
    wherein the value n of the first communication penalty and the number n of packets is the same number, and wherein the value m of the second communication penalty and the number m of packets is the same number.

2. The method of claim 1, wherein the first connection and the second connection are between the device and a second device.

3. The method of claim 1, wherein the device is an intermediary device, and the first connection and the second connection are between a second device and a third device and traverse the intermediary device.

4. The method of claim 1, wherein determining the first communication penalty and the second communication penalty comprises identifying a packet loss rate of each of the first connection and the second connection.

5. The method of claim 1, wherein determining the first communication penalty and the second communication penalty comprises identifying a congestion window of each of the first connection and the second connection.

6. The method of claim 1, wherein determining the first communication penalty and the second communication penalty comprises determining a compression ratio of each of the first connection and the second connection.

7. The method of claim 1, wherein the first communication penalty is inversely proportional to a transmission rate of the first connection.

8. The method of claim 1, further comprising determining that an average throughput of the first connection and second connection is greater than a threshold; and wherein scheduling transmission of the packets via the first connection and second connection according to the ratio of the communication penalties is performed responsive to the determination that the average throughput of the first connection and second connection is greater than the threshold.

9. The method of claim 1, further comprising determining that the ratio of the first communication penalty to the second communication penalty is greater than a threshold; and wherein scheduling transmission of the packets via the first connection and second connection according to the ratio of the communication penalties is performed responsive to the determination that the ratio of the first communication penalty to the second communication penalty is greater than the threshold.

10. A system for multi-connection packet scheduling, comprising:
    a device comprising a network interface in communication with at least one other device via a first connection and a second connection, and a processor circuit configured to:
        monitor communication flows via the first connection and a second connection,
        determine a value n of a first communication penalty for the first connection and a value m of a second communication penalty for the second connection,
        determine a ratio of the value n of the first communication penalty and the value m of the second communication penalty,
        schedule transmission of packets via the first connection and the second connection according to an inverse of the ratio of the value n of the first communication penalty to the value m of the second communication penalty, and
        transmit a number m of packets via the first connection and a number n of packets via the second connection during a predetermined time period;
    wherein the value n of the first communication penalty and the number n of packets is the same number, and wherein the value m of the second communication penalty and the number m of packets is the same number.

11. The system of claim 10, wherein the first connection and the second connection are between the device and a second device.

12. The system of claim 10, wherein the device is an intermediary device, and the first connection and the second connection are between a second device and a third device and traverse the intermediary device.

13. The system of claim 10, wherein the processor circuit is further configured to determine a packet loss rate of each of the first connection and the second connection.

14. The system of claim 10, wherein the processor circuit is further configured to identify a congestion window of each of the first connection and the second connection.

15. The system of claim 10, wherein the processor circuit is further configured to determine a compression ratio of each of the first connection and the second connection.

16. The system of claim 10, wherein the first communication penalty is inversely proportional to a transmission rate of the first connection.

17. The system of claim 10, wherein the processor circuit is further configured to determine an average throughput of the first connection and the second connection is greater than a predetermined threshold; and wherein scheduling transmission of the packets via the first connection and second connection according to the ratio of the communication penalties is performed responsive to the determination that the average throughput of the first connection and second connection is greater than the predetermined threshold.

18. The system of claim 10, wherein the processor circuit is further configured to determine determining that the ratio of the first communication penalty to the second communication penalty is greater than a predetermined threshold; and wherein scheduling transmission of the packets via the first connection and second connection according to the ratio of the communication penalties is performed responsive to the determination that the ratio of the first communication penalty to the second communication penalty is greater than the predetermined threshold.

\* \* \* \* \*